Patented Jan. 5, 1937

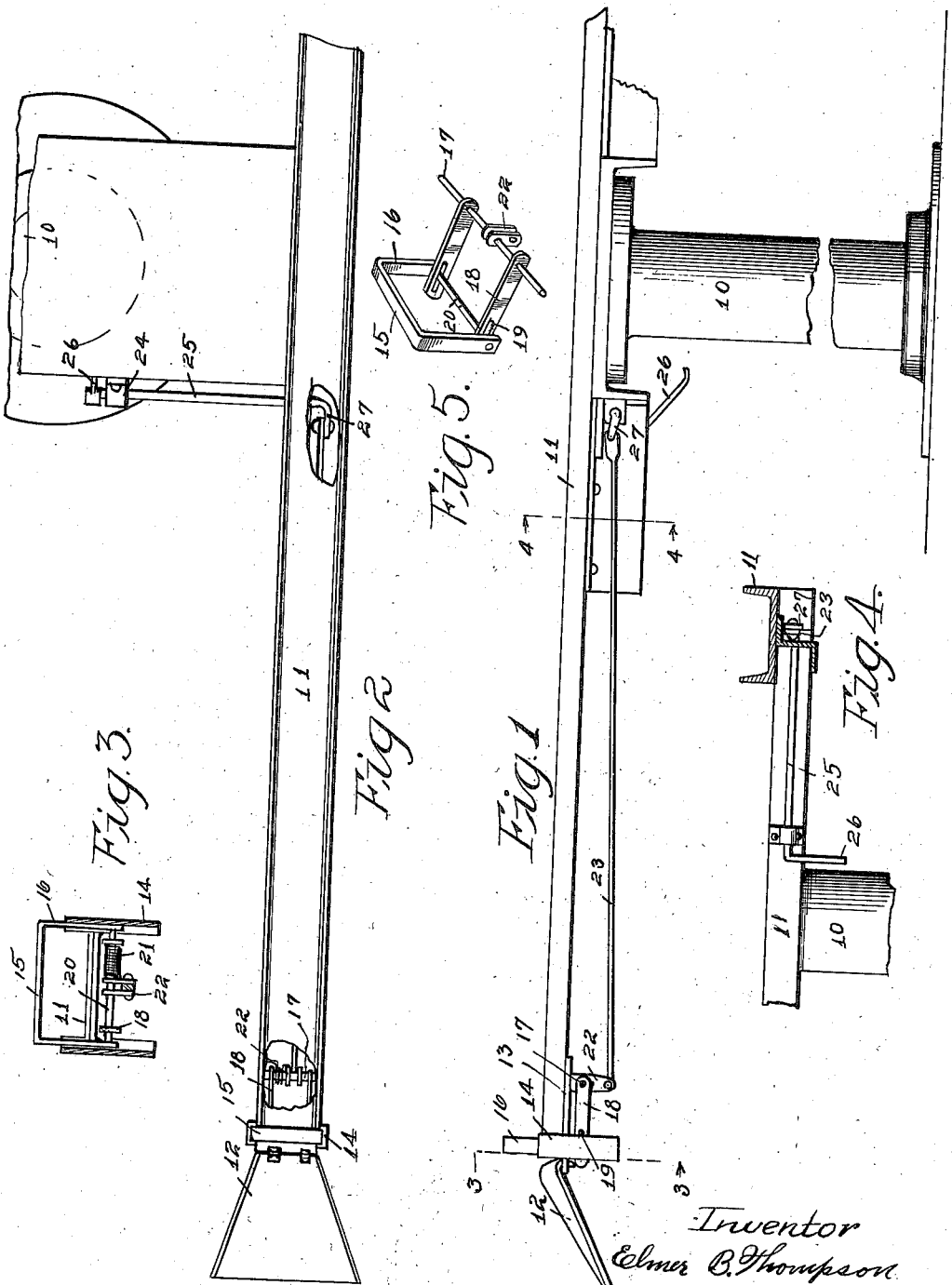

2,066,916

UNITED STATES PATENT OFFICE 2,066,916

WHEEL STOP DEVICE FOR AUTOMOBILE LIFTS

Elmer B. Thompson, Des Moines, Iowa, assignor to Globe Machinery & Supply Company, Des Moines, Iowa, a corporation of Iowa Application July 19, 1934, Serial No. 736,066

2 Claims. (Cl. 254—89)

My invention relates to that class of auto lifts provided with runways for the auto wheels, and my object is to provide an automatically operated wheel stop device of simple and inexpensive construction which is held in flat position on the runway when the lift is lowered so that no part of the stop is in position to interfere with the auto being run on to the runway or be in the way of the operator and which will automatically move to an elevated position to serve as a wheel stop when the lift is elevated.

A further object is to provide a wheel stop slidingly mounted in upright guides in the lift runway and so arranged that if an auto wheel pressed against it, it would bind in said guideways and be thereby held against downward movement.

A further object is to provide an automatic locking device for holding the wheel stop in its elevated position, which locking device is released upon the movement of the lift toward the floor.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a side view of a part of an automobile lift having my improved wheel stop device applied thereto.

Figure 2 is a top or plan view of same.

Figure 3 is a vertical transverse sectional view on the line 3—3 of Figure 1.

Figure 4 shows a detail vertical sectional view on line 4—4 of Figure 1 through one of the runways and illustrating the shaft and its crank arms; and Figure 5 shows a perspective view illustrating the stop device and the means for elevating it.

Referring to the accompanying drawing I have used the reference numeral 10 to indicate generally the automobile lift and the numeral 11 to indicate a wheel runway thereon. At the end of the lift there is the usual ramp 12 over which the automobile may be driven upon the wheel runway 11. Attached to the under surface of the wheel runway 11, near one end, is a supporting plate 13 having at its opposite sides upright channel bars 14 forming guideways at the sides of the wheel runway.

The wheel stop proper comprises a straight body portion 15 having downwardly extended ends 16 slidingly mounted in said guides 14. When the wheel stop is in its lowered position it lies flat against the top of the wheel runway, and when in its elevated position it stands across the runway at such an elevation as would prevent an automobile wheel from passing over it.

Mounted on the under surface of the plate 13 is a crank shaft 17 having two crank arms 18 with slots 19. A rod 20 is connected to the lower ends of both of the members 16 of the wheel stop and extends through these slots 19. By this arrangement when the crank shaft 17 is moved to one position the wheel stop 15 will be moved to lie flat upon the top of the wheel runway, and when the crank shaft 17 is moved to its other position the wheel stop will be moved by the crank arms 18 and rod 20 to the elevated position of the wheel stop.

Mounted upon the shaft 17 is a torsional spring 21 arranged to normally hold the crank shaft 17 in position for elevating the wheel stop by having one end of the spring engage the arms 22 and the other end of the spring engage the under surface of the plate 13.

Fixed to the shaft 17 is a crank arm 22 to which is pivoted a rod 23. Fixed to a part of the automobile lift frame is a bracket 24 in which there is mounted a crank shaft 25. On one end of this crank shaft 25 is a crank arm 26 which extends downwardly to such position that when the lift is in its lowered position this crank arm will engage the lift base or the adjacent floor and move said crank arm to a horizontal position.

At the other end of the shaft 25 is a crank arm 27 to which the rod 23 is pivoted. This crank arm 27 is so positioned relative to the rod 23 that, during the movement of the crank arm 26 from its horizontal position to its inclined position, the crank arm 27 will pass dead center relative to a line drawn from the shaft 25 to the point where the rod 23 connects with the crank arm 22, so that when in this elevated position the wheel stop 15 will be thereby locked in an elevated position, and the only manner in which it may be lowered is by moving the crank arm 27 downwardly past dead center. When said crank arm moves upwardly past dead center the rod 23 engages the adjacent portion of the lift, as shown in Figure 1, and stops further movement of the crank arm. The crank arms and shafts function as a lever.

In practical operation I have demonstrated that with my improved wheel stop an automobile may be readily and easily run to the wheel runway without being interfered with in any manner by the wheel stop because it lies flat against the bottom of the wheel runway. Then, when the lift is elevated a slight distance above the floor, and without any attention on the part of the operator, the wheel stop is automatically elevated to the position where it will prevent the automobile wheel from running off of the wheel runway whether the brakes are set or not.

I have found that by slidingly connecting the upright member 16 in the guides 14 when an automobile wheel is forced against the wheel stop 15, it will push the wheel stop laterally and cause the upright 16 to bind in the guides 14 to thereby hold the wheel stop against downward movement.

In addition to this I have found that when the wheel stop is moved by the spring to its elevated position the crank 27 will pass dead center, forming a positive lock against downward movement of the wheel stop such as might be caused in a downward direction upon the wheel stop, and have also demonstrated that when the crank arm 26 is moved downwardly and strikes the base the crank 27 will be turned to move past dead center and pull the arm 23 in the direction required for moving the wheel stop downwardly to its position lying flat upon the surface of the wheel runway.

I claim as my invention:

1. The combination with an automobile lift having runways, of a wheel stop device comprising a wheel stop body slidingly mounted for vertical movement in a runway from a position substantially flush with the runway to an elevated position for functioning as a wheel stop, a shaft carried by the lift, a crank arm on the shaft for engagement with an object in the path of travel of the lift for rotating the shaft part of a revolution, a second crank arm on the shaft, a rod connected to the said second crank arm and operatively connected to the wheel stop for lowering the wheel stop when the shaft is turned, a yielding pressure means for normally holding the wheel stop in its elevated position, means for limiting the movement of said second crank in one direction so that as the crank arm passes a dead center during its movement to position for raising the wheel stop, the wheel stop will be locked in its elevated position.

2. The combination with an automobile lift having runways, of vertical guide devices on opposite sides of one end of one of said runways; a wheel stop slidingly mounted in said guide devices; a bell crank lever device pivotally mounted beneath said runway; means for operatively connecting one end of said bell crank lever to said stop device; a link having one end pivotally connected to the other arm of said bell crank lever; a rock shaft having a downwardly inclined arm fixed to one end adapted to be actuated by engagement with an object during a downward movement of the lift to rock said shaft; a crank arm secured to the other end; means for pivotally connecting one end of said link to said crank arm; means for limiting the movement of said crank arm in one direction so that as the crank arm passes a dead center during its movement to position for raising the wheel stop, the wheel stop will be locked in its elevated position.

ELMER B. THOMPSON.